US 9,529,152 B2

(12) United States Patent
James et al.

(10) Patent No.: US 9,529,152 B2
(45) Date of Patent: Dec. 27, 2016

(54) LASER CLEAVING MULTI-ROW RIBBON FIBERS

(71) Applicant: CORNING OPTICAL COMMUNICATIONS LLC, Hickory, NC (US)

(72) Inventors: Kenneth Todd James, Lenoir, NC (US); Xin Liu, Hickory, NC (US); Alvin John McDonald, Lenoir, NC (US)

(73) Assignee: Corning Optical Communications LLC, Hickory, NC (US)

( * ) Notice: Subject to any disclaimer, the term of this patent is extended or adjusted under 35 U.S.C. 154(b) by 56 days.

(21) Appl. No.: 14/529,603

(22) Filed: Oct. 31, 2014

(65) Prior Publication Data
US 2016/0124150 A1 May 5, 2016

(51) Int. Cl.
| G02B 6/25 | (2006.01) |
| B23K 26/38 | (2014.01) |
| G02B 6/44 | (2006.01) |
| G02B 6/36 | (2006.01) |

(52) U.S. Cl.
CPC ............ *G02B 6/25* (2013.01); *G02B 6/3616* (2013.01); *G02B 6/4404* (2013.01)

(58) Field of Classification Search
CPC ....... G02B 6/25; G02B 6/3616; G02B 6/4404; B23K 26/38; B23K 26/402; B23K 2201/36
See application file for complete search history.

(56) References Cited

U.S. PATENT DOCUMENTS

| 3,622,742 | A | * | 11/1971 | Cohen | B23K 26/0823 |
| | | | | | 219/121.6 |
| 8,069,691 | B2 | * | 12/2011 | Murgatroyd | G02B 6/25 |
| | | | | | 225/96.5 |
| 2002/0106161 | A1 | | 8/2002 | Kiani | |
| 2003/0205562 | A1 | * | 11/2003 | Vergeest | B23K 26/0648 |
| | | | | | 219/121.72 |
| 2010/0215319 | A1 | | 8/2010 | Childers et al. | |
| 2011/0026882 | A1 | * | 2/2011 | Budd | G02B 6/32 |
| | | | | | 385/52 |
| 2011/0198324 | A1 | * | 8/2011 | de Jong | G02B 6/245 |
| | | | | | 219/121.72 |
| 2011/0206340 | A1 | * | 8/2011 | Kobayashi | G02B 6/4471 |
| | | | | | 385/137 |
| 2012/0027358 | A1 | * | 2/2012 | Webb | G01B 11/02 |
| | | | | | 385/78 |

(Continued)

FOREIGN PATENT DOCUMENTS

EP  2522473 A1 * 11/2012

OTHER PUBLICATIONS

Patent Cooperation Treaty International Search Report, Application No. PCT/US2015/056812, Jan. 11, 2016, 5 pages.

*Primary Examiner* — Geoffrey S Evans

(57) ABSTRACT

A laser cleaving system includes a laser and a fixture including holders for respectively holding optical fiber ribbons at different angular positions. The fixture is rotatable relative to the laser for facilitating serial cleaving of the optical fiber ribbons. The fixture is configured for holding the ribbons in a predetermined manner so that the cleaved optical surfaces are of high quality and coplanar, such as when installed in a ferrule. For example, the fixture separates the ends of the ribbons from one another so that the ribbons being held by the fixture may be cleaved substantially independently from one another.

18 Claims, 6 Drawing Sheets

(56) References Cited

U.S. PATENT DOCUMENTS

| | | | |
|---|---|---|---|
| 2012/0051706 A1* | 3/2012 | van Geffen | G02B 6/3833 |
| | | | 385/134 |
| 2012/0093462 A1 | 4/2012 | Childers et al. | |
| 2014/0079357 A1* | 3/2014 | McColloch | G02B 6/3839 |
| | | | 385/92 |
| 2014/0321809 A1 | 10/2014 | Bowen et al. | |

* cited by examiner

LASER CLEAVING MULTI-ROW RIBBON FIBERS

BACKGROUND

This disclosure generally relates to optical fibers and, more particularly, to methods and systems for cleaving optical fibers.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or in the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical communication to be established when the optical fiber is aligned with another optical fiber provided in the mating component (the other fiber optic connector or adapter).

The bores of the ferrule in a fiber optic connector extend to a front of the ferrule. With such a design, an optical fiber can be inserted into and passed through the ferrule. Either before of after securing the optical fiber relative to the ferrule (e.g., by using a bonding agent in the bore), an optical surface may be formed on the optical fiber. One conventional method of forming an optical surface involves a mechanical cleaving step followed by several mechanical polishing steps. Such methods can be time-consuming and labor-intensive due to the number of polishing steps that may be required to form an optical surface of high quality.

Various techniques for laser cleaving and polishing an optical fiber are also known, both before and after insertion into a ferrule. Although these techniques may help reduce or eliminate some of the mechanical polishing steps associated with forming an optical surface, there remains room for improvement.

SUMMARY

According to one embodiment of this disclosure, a method for processing (e.g., cleaving) optical fibers may comprise: at least partially supporting first and second pluralities of optical fibers with a fixture; cleaving the first plurality of optical fibers with at least one laser while the first and second pluralities of optical fibers are at least partially supported by the fixture; then causing relative movement between the fixture and the at least one laser while the first and second pluralities of optical fibers are at least partially supported by the fixture; and then cleaving the second plurality of optical fibers with the at least one laser while the first and second pluralities of optical fibers are at least partially supported by the fixture. The above-described steps may be repeated for numerous pluralities of optical fibers that extend from the same cable.

The fixture may be configured hold the optical fibers in a predetermined manner that seeks to ensure that the cleaved optical surfaces are of high quality and substantially coplanar, such as when installed in a ferrule. For example, the fixture may at least partially separate the first and second pluralities of optical fibers from one another so that the first plurality of optical fibers may be cleaved substantially independently from the second plurality of optical fibers, and vice versa, which seeks to ensure that the cleaved optical surfaces are of high quality.

The pluralities of optical fibers may be parts of respectively optical fiber ribbons. Accordingly, another example of a method for processing optical fibers may comprise: at least partially supporting and at least partially separating a plurality of optical fiber ribbons with a fixture, comprising at least partially supporting each of first and second optical fiber ribbons of the plurality of optical fiber ribbons with the fixture; cleaving the first optical fiber ribbon with at least one laser while the first and second optical fiber ribbons are at least partially supported by the fixture; then causing relative movement between the fixture and the at least one laser while the first and second optical fiber ribbons are at least partially supported by the fixture; and then cleaving the second optical fiber ribbon with the at least one laser while both of the first and second optical fiber ribbons are at least partially supported by the fixture. The above-described steps may be repeated for numerous optical fiber ribbons that extend from the same cable.

Similarly to indicated above, the fixture may be configured hold the optical fiber ribbons in a predetermined manner that seeks to ensure that the cleaved optical surfaces are of high quality and substantially coplanar, such as when installed in a ferrule. For example, the fixture may at least partially separate the first and second optical fiber ribbons from one another so that the first optical fiber ribbon may be cleaved substantially independently from the second optical fiber ribbon, and vice versa, which seeks to ensure that the cleaved optical surfaces are of high quality.

In accordance with another embodiment of this disclosure, a laser cleaving system comprises a laser and a fixture, wherein the fixture may include holders for respectively holding optical fiber ribbons at different angular positions. The fixture is rotatable relative to the laser for facilitating serial cleaving of the optical fiber ribbons. The laser may be mounted to a frame for providing at least one laser beam path; and the fixture may be mounted to the frame for rotating between a plurality of configurations in which the holders are located at different distances from the laser beam path for facilitating serial cleaving of the optical fiber ribbons. The holders may be in the form of elongate receptacles that extend divergently with respect to one another in a direction away from a rotary axis of the fixture. The laser cleaving system may include an actuator and controller for at least partially automating the process of serially cleaving.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
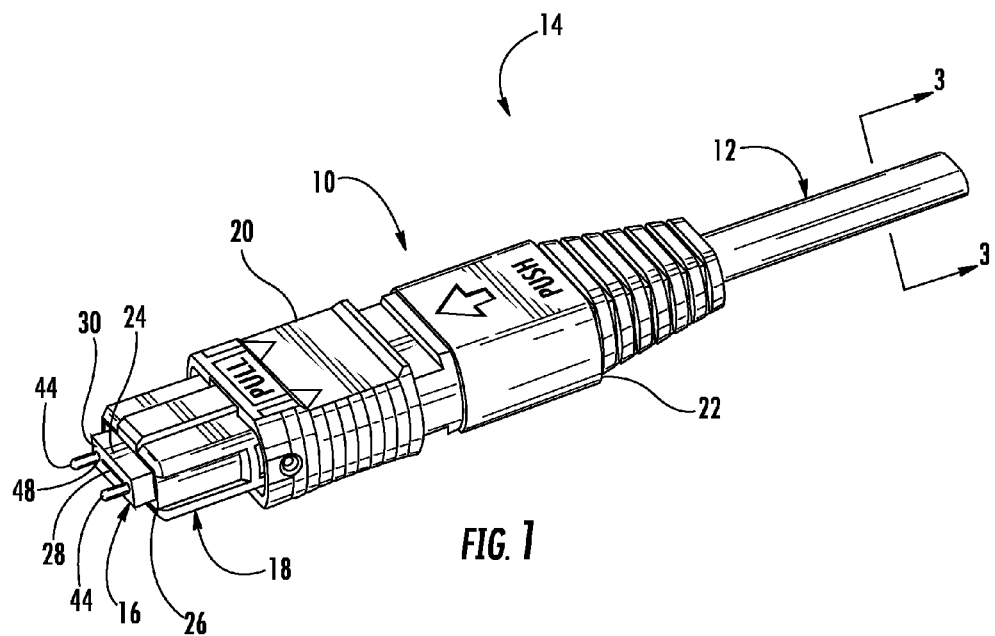
FIG. 1 is a perspective view of an example of a fiber optic cable assembly that includes a fiber optic connector.
Figure 2:
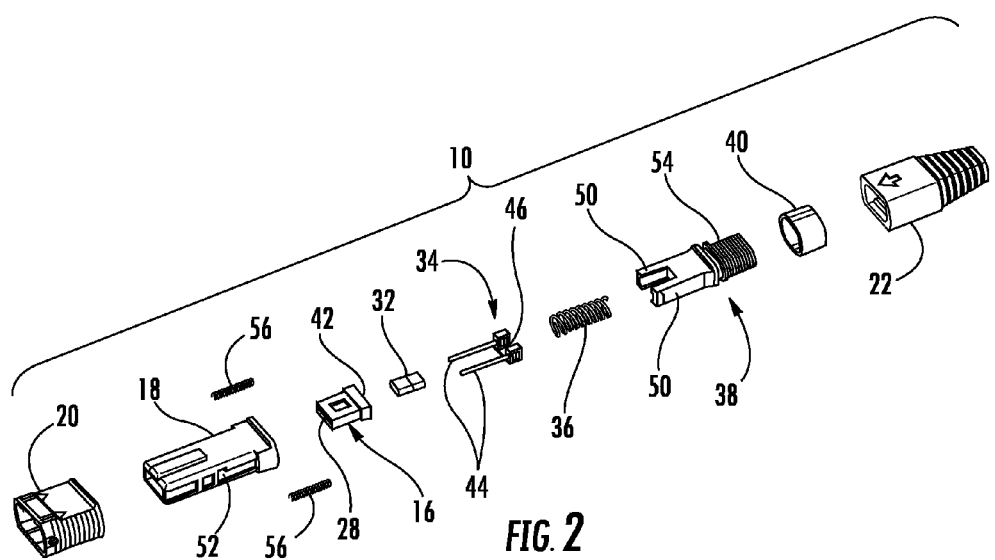
FIG. 2 is an exploded perspective view of the connector of FIG. 1.

Various embodiments will be further clarified by examples in the description below. In general, the description relates to laser cleaving systems and methods of cleaving optical fibers. The methods may be part of a cable assembly process for a fiber optic cable. That is, the methods may be part of terminating optical fibers from a fiber optic cable with a fiber optic connector to form a cable assembly. One example of a fiber optic connector ("connector") 10 for such a cable assembly is shown in FIGS. 1 and 2, and this type of connector may be referred to as a multi-fiber push on (MPO) connector, which includes a push-pull latch, and incorporates a mechanical transfer (MT) ferrule. These connectors can achieve a very high density of optical fibers, which reduces the amount of hardware, space, and effort to establish a large number of interconnects. A general discussion of the connector 10 will be provided, followed by a discussion of an example of a laser cleaving system 11 (FIG. 6) and methods for laser cleaving multi-row ribbon fibers, or the like. Although the connector 10 is shown in the form of a MPO-type connector, the cleaving system 11 and methods described below may be applicable to processes involving different fiber optic connector designs, and different types of fiber optic cable assemblies.

As shown in FIG. 1, the connector 10 may be installed on a fiber optic cable ("cable") 12 to form a fiber optic cable assembly 14. The connector 10 includes a ferrule 16, a housing 18 received over the ferrule 16, a slider 20 received over the housing 18, and a boot 22 received over the cable 12. The ferrule 16 is spring-biased within the housing 18 so that a front portion 24 of the ferrule 16 extends beyond a front end 26 of the housing. Optical fibers (not shown in FIGS. 1 and 2) carried by the cable 12 extend through bores 28 in the ferrule 16 before terminating at or near a front end face 30 of the ferrule 16. There may be four rows of the bores 28, with each row including eight of the bores 28, although it is within the scope of this disclosure for there to be a greater or lesser number of each of the rows and bores. The optical fibers are secured within the ferrule 16 using an adhesive material (e.g., epoxy) and can be presented for optical coupling with optical fibers of a mating component (e.g., another fiber optic connector; not shown) when the housing 20 is inserted into an adapter, receptacle, or the like.

As shown in FIG. 2, the connector 10 further includes a ferrule boot 32, guide pin assembly 34, spring 36, retention body ("crimp body") 38, and crimp ring 40. The ferrule boot 32 is received in a rear portion 42 of the ferrule 16 to help support the optical fibers extending to the bores 28 (FIG. 1). The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (FIG. 1) provided in the ferrule 16 so as to project beyond the front end face 30. The presence of the guide pins 44 means that the connector 10 is in a male configuration. In a female configuration the guide pins 44 are not present. As another example, the guide pin assembly 34 may be omitted, such as when other provisions may be made for alignment, as may be the case when the ferrule 16 includes molded-in post and hole alignment features, as will be discussed in greater detail below.

Both the ferrule 16 and guide pin assembly 34 (if present) are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled. The crimp body 38 includes latching arms 50 that engage recesses 52 in the housing 18. The spring 36 is compressed by this point and exerts a biasing force on the ferrule 16, such as via the pin keeper 46. The rear portion 42 of the ferrule 16 defines a flange that interacts with a shoulder or stop formed within the housing 18 to retain the rear portion 42 within the housing 18.

In a manner not shown in the figures, aramid yarn or other strength members from the cable 12 are positioned over a rear end portion 54 of the crimp body 38 that projects rearwardly from the housing 18. The aramid yarn is secured to the end portion 54 by the crimp ring 40, which is slid over the end portion 54 and deformed after positioning the aramid yarn. The boot 22 covers this region, as shown in FIG. 1, and provides strain relief for the optical fibers by limiting the extent to which the connector 10 can bend relative to the cable 12.

The word "PUSH" may printed on the boot 22 to help direct a user to grasp the boot 22 when inserting the connector 10 into an adapter or receptacle, thereby allowing the housing 18 to be fully inserted for proper engagement/mating with the adapter or receptacle. The word "PULL" may be printed on the slider 20, which may be biased by springs 56 (FIG. 2) relative to the housing 18, to help direct a user to grasp the slider 20 when disengaging the connector 10 from an adapter or receptacle. This way pull forces are transferred directly to the housing 18 (rather than the cable 12) to disengage the housing 18 from the adapter or receptacle.

Figure 3:
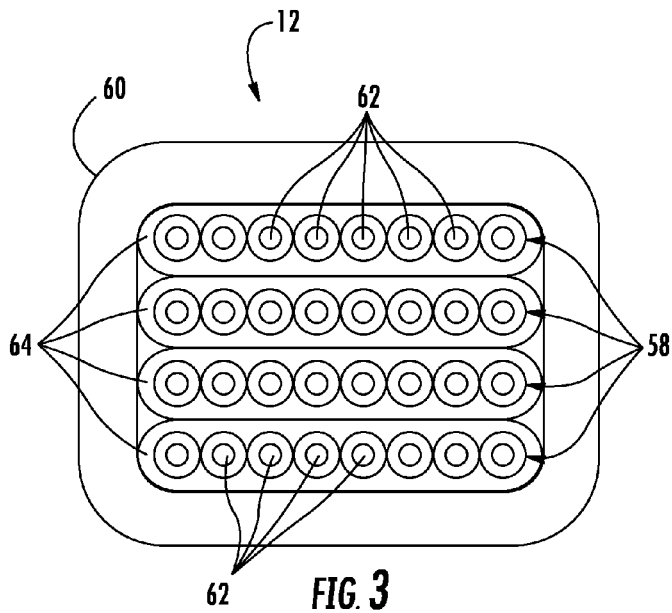
FIG. 3 is a schematic cross-sectional view of a fiber optic cable of the fiber optic cable assembly of FIG. 1, wherein the cross section is taken along line 3-3 of FIG. 1.

As schematically shown in FIG. 3, the cable 12 includes a stack of longitudinally extending optical fiber ribbons ("ribbons") 58 within a longitudinally extending sheath 60, wherein each ribbon 58 includes a lateral array of optical fibers ("fibers") 62 that transmit light. The ribbons 58, sheath 60, and fibers 62 may be conventional. For example, each ribbon 34 may include a solidified, conventional bonding material 64 that fills the interstices between and binds together its fibers 62. Whereas four ribbons 58 each including eight fibers 62 are shown in FIG. 3, there may be different numbers of ribbons and fibers in alternative embodiments. For example, each ribbon 58 may include twelve or sixteen fibers 62, although it is within the scope of this disclosure for there to be a greater or lesser number of each of the ribbons and fibers.

Figure 4:
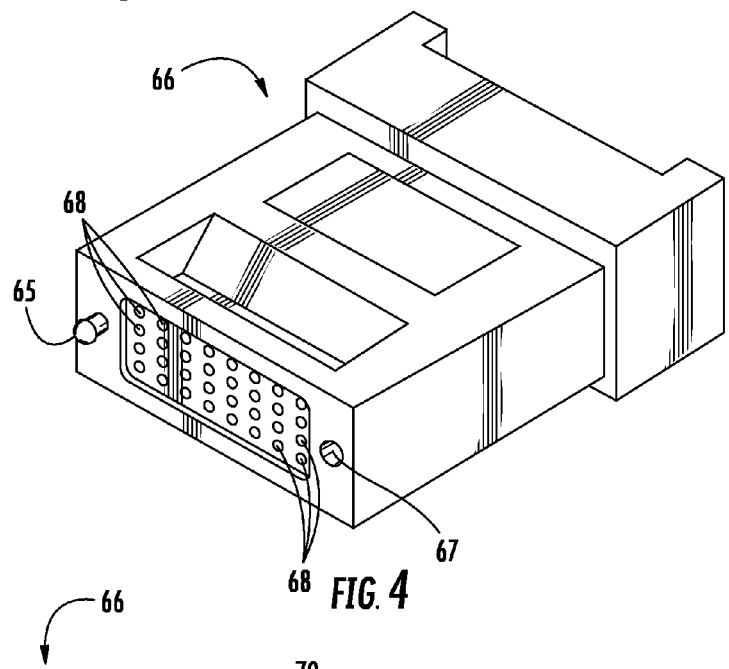
FIG. 4 is a schematic, front perspective view of a ferrule that may be part of the connector of FIG. 1.
Figure 5:
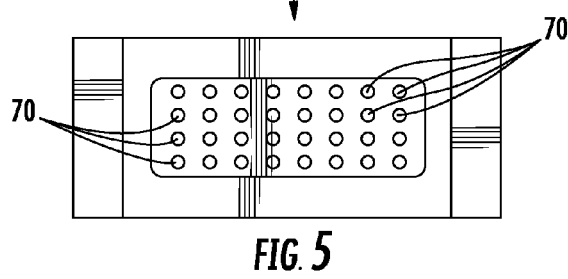
FIG. 5 is a schematic, rear elevation view of the ferrule of FIG. 4.

Referring back to FIG. 2 and reiterating from above, at least some of the guide pin assembly 34 may be omitted, such as when other provisions are made for alignment. For example, FIG. 4 shows a ferrule 66 that includes molded-in post and hole alignment features 65, 67 and may be used in place of the ferrule 16 in the connector 10. For example, the ferrule 66 may be a lensed, collimated beam, MT-style ferrule. Examples of such ferrules are disclosed in U.S. Pat. Ap. Pub. No. 2012/0093462, the entire disclosure of which is incorporated herein by reference. Referring to FIG. 4 in greater detail, the ferrule 66 includes four rows of lenses 68 that are recessed in the front end face of the ferrule 66. The lenses are configured to be in optical communication with cleaved ends of fibers 62 respectively disposed within bores 70 (FIG. 5) of the ferrule 66, as will be discussed in greater detail below. It is within the scope of this disclosure for there to be a greater or lesser number the lenses 68, bores 70, and associated rows.

In accordance with a first embodiment of this disclosure, the ends of the fibers 62 are cleaved by the cleaving system 11 (FIG. 6) prior to being respectively inserted into the bores 70 from the rear side of the ferrule 66, as will be disused in greater detail below. In accordance a second embodiment associated with the ferrule 16 of FIGS. 1 and 2, the cleaving system 11 may be configured for cleaving the ends of fibers 62 protruding from the bores 28 at the front end face 30 of the ferrule 16.

Figure 6:
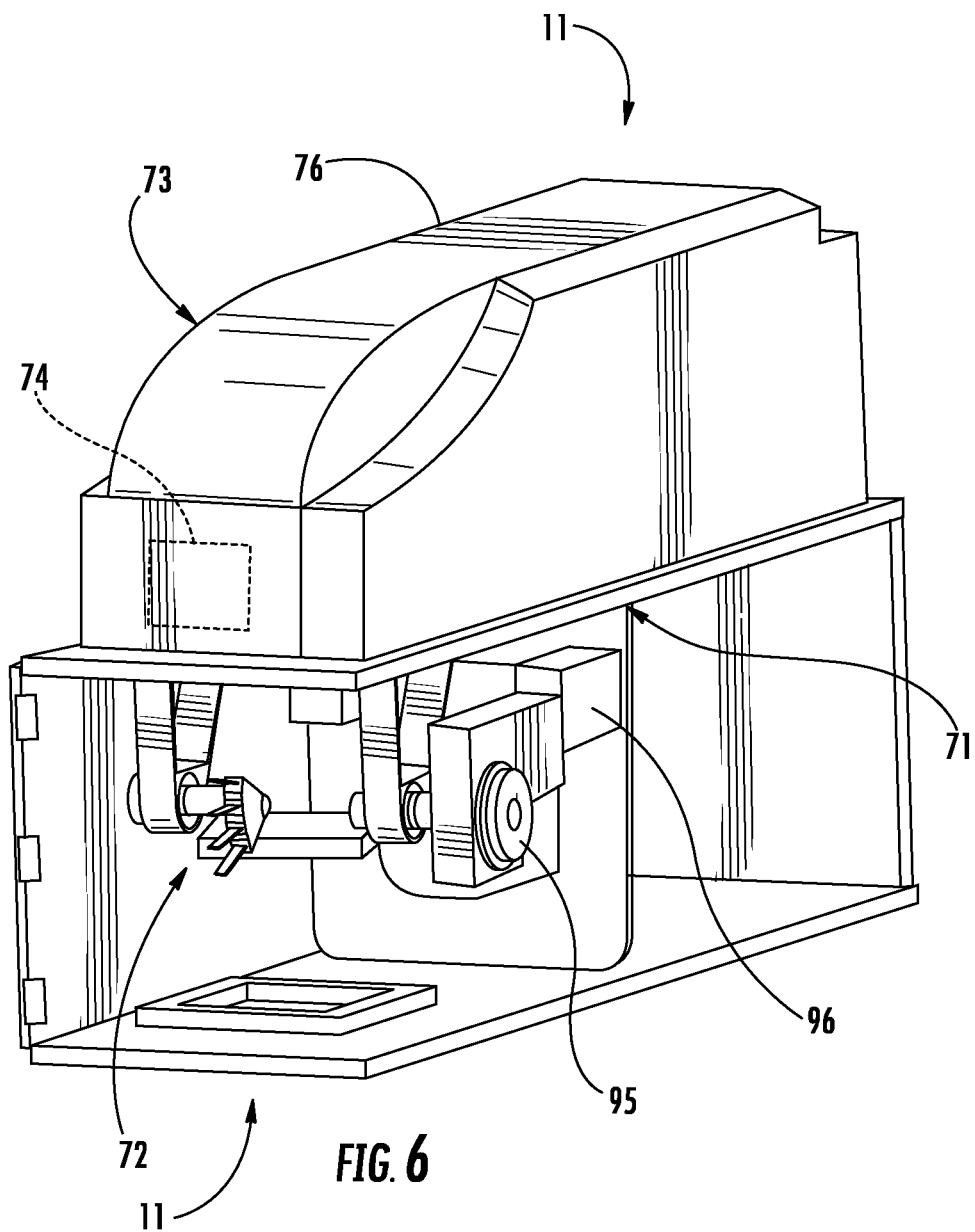
FIG. 6 schematically illustrates a laser cleaving system in accordance with an embodiment of this disclosure.
Figure 7:
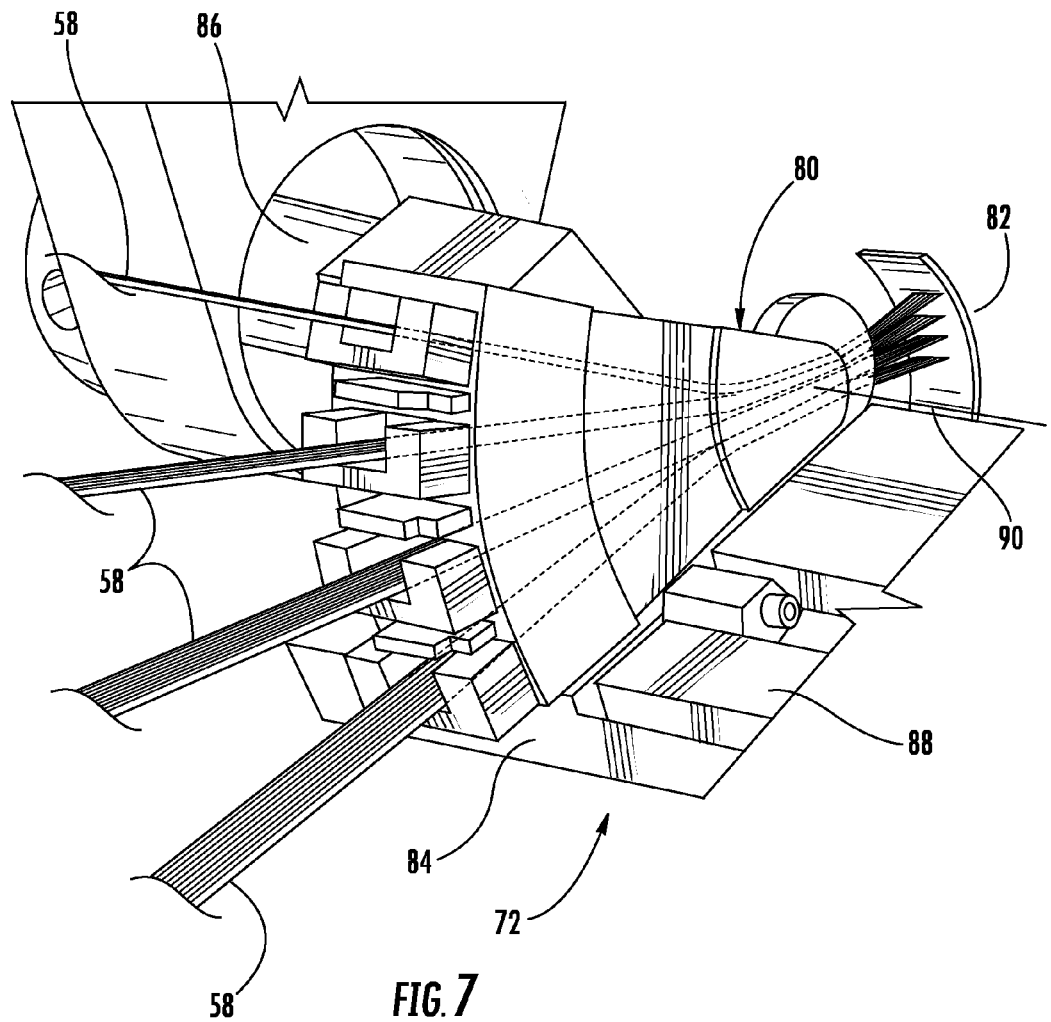
FIG. 7 schematically illustrates a portion of the laser cleaving system of FIG. 6.

FIGS. 6 and 7 illustrate an embodiment of a cleaving system 11 that may be used to cleave ends of the fibers 62, such as prior to the fibers being respectively inserted into the bores 70 from the rear side of the ferrule 66. The cleaving system 11 may be operated to serially cut the ribbons 58 of the cable 12 in a manner such that the cleaved ends of the fibers 62 are substantially coplanar with one another when they are installed, for example, in the ferrule 66. This substantial coplanarity of the cleaved ends of the fibers 62 seeks to minimize any connector insertion losses. In accordance with one aspect of this disclosure, the cleaving system 11 may be operated in a manner that allows at least one laser of the cleaving system to cleave all ribbons 58 automatically, and in a manner that seeks to reduce cycle times and achieve substantial coplanarity across all of the cleaved fibers 62.

In the embodiment shown in FIG. 6, the cleaving system 11 includes a frame 71 supporting both a laser cutter 73 and rotor assembly ("rotor") 72 that are arranged so that at least one laser head 74 of the laser cutter is positioned above the rotor for downwardly emitting at least one laser beam at a position proximate the rotor. In FIG. 6, the laser head 74 is hidden from view within a downwardly open housing 76 of the laser cutter 73; therefore, the laser head 74 is schematically illustrated by dashed lines. In the embodiment shown in the drawings, the laser head 74 may be configured for emitting the laser beam vertically downwardly, and a pivotable mount, movable mirror(s), and/or movable lens(es) are associated with the laser head and/or laser beam for causing the laser beam to move, or more specifically pivot or sweep, in a substantially vertical plane, which may be referred to as a cleaving plane 78 (FIGS. 8-11). The one or more paths of the laser beam from the laser head extend in the cleaving plane 78. The laser cutter 73 is configured so that the emitted laser beam is for cleaving one or more optical fibers 62, or more specifically a ribbon 58, positioned in the cleaving plane 78. For example, energy from the laser beam 54 may melt or ablate the end portion of an optical fiber 62 to form an optical surface. For example, the laser cutter 73 may include a $CO_2$ laser, or any other suitable lasers for cleaving optical fibers.

Referring to FIG. 7, which illustrates a portion of the cleaving system 11, the system further includes one or more fixtures 80. Differently configured fixtures 80 may be configured for accommodating differently configured cables 12 by holding differently configured ribbons 58. Each fixture 80 may be releasably mounted to the rotor 72 for rotating with the rotor and carrying ribbons 58 so that spaced apart ends of the ribbons travel along an arc 82. The rotor 72 may include a platform 84 having opposite ends respectively fixedly mounted to outwardly extending support shafts 86 that are respectively mounted to the frame 71 of the cleaving system 11 by way of rotary bearings or in any other suitable manner. In one example, a fixture 80 may be releasably mounted to the platform 84 by being inserted between and held by clamps 88 or any other suitable fastening mechanisms. The platform 84 may be mounted to the shafts 86 in an offset manner so that rotational axes 90 of the rotor 72 and a fixture 80 mounted to the rotor are coaxial.

Figure 8:
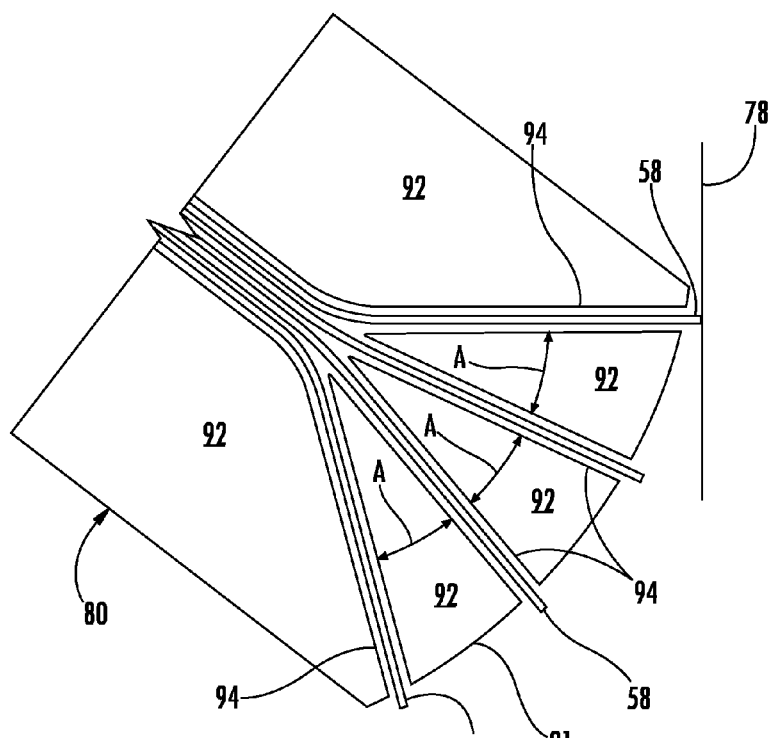
FIG. 8 schematically illustrates optical fiber ribbons (e.g., of the fiber optic cable of FIG. 3) installed in a fixture of the laser cleaving system of FIG. 6, in accordance with an embodiment of this disclosure.
Figure 9:
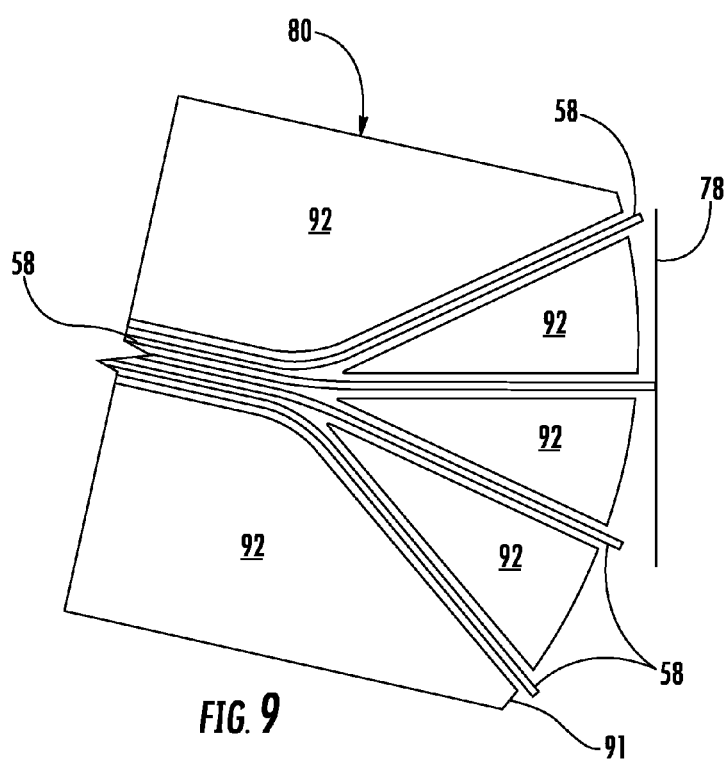
FIG. 9 is like FIG. 8, but shows an example of a second configuration, which may be achieved by rotating the fixture, through an angular range, away from the configuration of FIG. 8.
Figure 10:
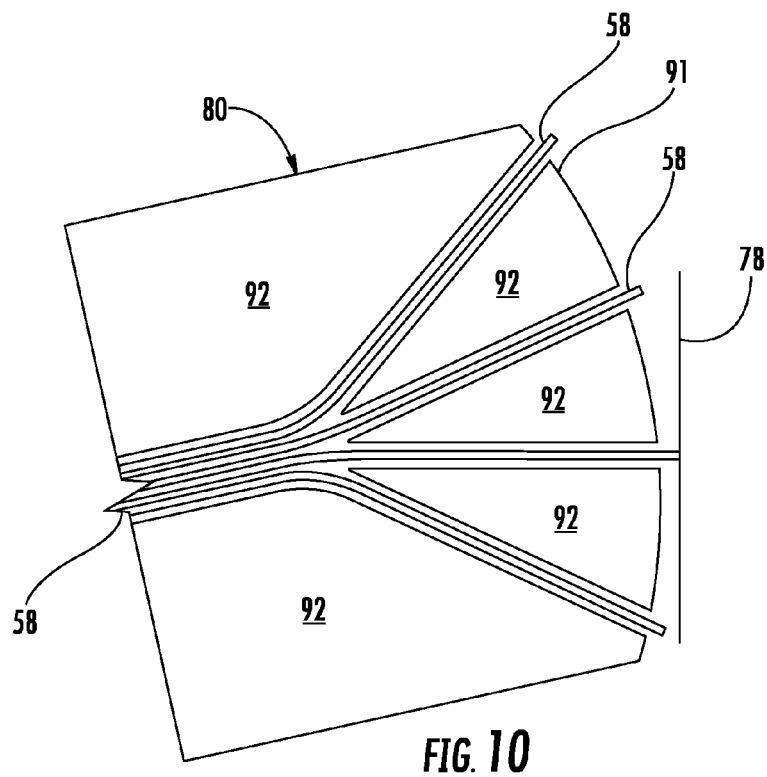
FIG. 10 is like FIG. 8, but shows an example of a third configuration, which may be achieved by rotating the fixture, through an angular range, away from the configuration of FIG. 9.
Figure 11:
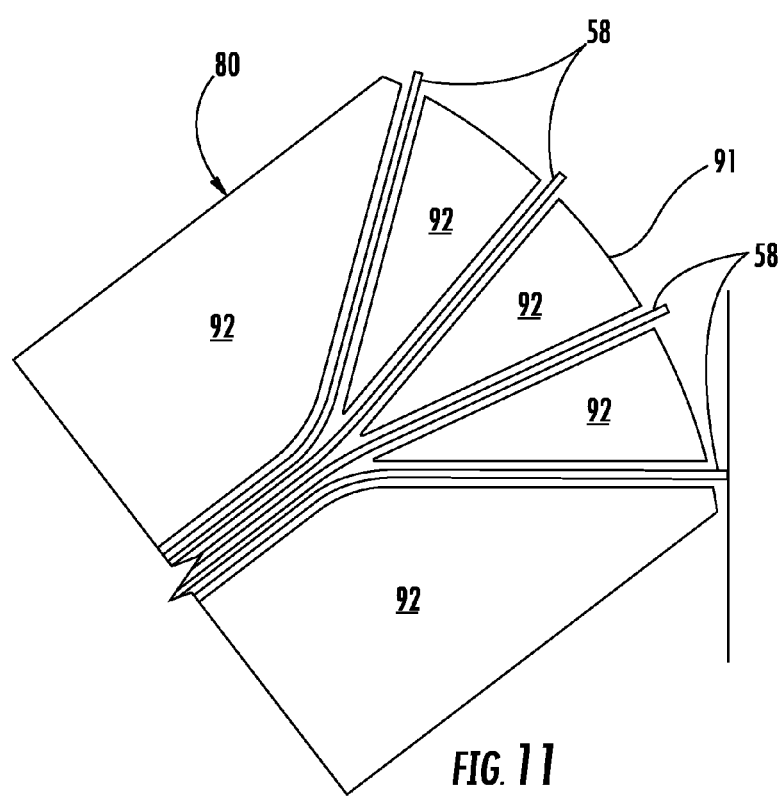
FIG. 11 is like FIG. 8, but shows an example of a fourth configuration, which may be achieved by rotating the fixture, through an angular range, away from the configuration of FIG. 10.

Referring to FIG. 8, a fixture 80 may include structures 92 between which are respectively defined elongate holder receptacles 94 for respectively removably receiving the ribbons 58 extending from an end of a cable 12 (FIGS. 1 and 3) that has been partially stripped of its sheath 60 (FIG. 3). That is, all of the ribbons 58 being supported by the fixture 80 may extend outwardly from within the sheath 60 of the same cable 12 while they are being processed by the cleaving system 11. Relative to the axis 90 (FIG. 7), the holder receptacles 94 occupy different angular positions and extend divergently from one another in an outward direction. An angle A may be defined between adjacent holder receptacles 94, and each of the angles A may be at least about 10°, within a range of from about 10° to about 50°, within a range of from about 20° to about 40°, about 30°, or the angles A may be of any other suitable magnitude(s) for suitably achieving the serial cleaving of the ribbons 58 carried by the holder receptacles. The holder receptacles 94 may be configured in a predetermined manner for releasably securing the ribbons 58 therein, such as by way of interference fits, clip(s), or any other suitable releasable fastening mechanisms.

The holder receptacles 94 are each open at an arcuate face 91 of the fixture 80, so that ends of ribbons 58 installed in the fixture extend outwardly from the arcuate face for selectively extending into the cleaving plane 78 in response to rotation of the rotor 72 (FIGS. 6 and 7) through respective angular ranges into respective configurations such as those schematically shown in FIGS. 8-11. Referring also to FIGS. 6 and 7, FIGS. 8-11 show a series of different configurations in which the ribbons 58 are respectively positioned in the cleaving plane 78 in response to the rotor 72 and fixture 80 being together rotated about the axis 90 so that the ends of the ribbons 58 travel along the arc 82. As best understood with reference to FIGS. 8-11, the distances between the cleaving plane 78 and other features (e.g., the terminal ends of the ribbons 58 and holder receptacles 94) vary in response to rotation of the fixture 80. In the embodiment shown in FIGS. 8-11, for transitioning between each of the adjacent configurations of FIGS. 8-11, the fixture 80 is rotated through an angular range having a magnitude that is substantially the same as that of the angles A defined between adjacent holder receptacles 94. In each of the configurations of FIGS. 8-11, the end portion of the ribbon 58 that extends into the cleaving plane 78 may extend substantially perpendicular to the cleaving plane.

The rotor 72 may be operatively associated with an actuator 95 and controller 98 so that the ribbons 58 are cleaved one at a time by sequentially presenting the ribbons to the cleaving plane 78 and operating the laser head 74 to cause the laser beam to move within the cleaving plane 78. That is, in the embodiment illustrated in the drawings, the holder receptacles 94 are configured so that while one of the ribbons 58 held by the fixture 80 is positioned in the cleaving plane 78 for being cleaved by the laser beam, the other ribbons being held by the fixture typically do not extend into the cleaving plane and, thus, are not impacted by the laser beam. After a first ribbon 58 is cleaved, the fixture 80 is rotated so that a second ribbon held by the fixture is positioned in the cleaving plane and is cleaved, and so on until the last ribbon held by the fixture is cleaved. During the cleaving of each ribbon 58, the fibers of the ribbon are typically cleaved one after the other in series, by a sweeping motion of the laser beam within the cleaving plane 78. The holder receptacles 94 are configured in a predetermined manner and the ribbons 58 are securely held in the holder receptacles, such as by way of interference fits, clip(s) or any other suitable releasable fastening mechanisms, so that the cleaved ends of the fibers 62 of the ribbons are substantially coplanar with one another when removed from the fixture 80, such as when they are installed, for example, in the ferrule 66.

In the embodiment illustrated in the drawings, the fixture 80 is configured for holding the ribbons 58 in a predetermined manner that seeks to ensure that the cleaved optical surfaces are of high quality and substantially coplanar, such as when installed in the ferrule 66. For example, the fixture 80 separates the ends of the ribbons 58 from one another so that the ribbons being held by the fixture may be cleaved substantially independently from one another, which seeks to ensure that the cleaved optical surfaces are of high quality.

The actuator 95 may be connected to or otherwise operationally associated with the rotor 72 for causing the fixture 80 to be moved in steps between its different configurations, examples of which are shown in FIGS. 8-11, and for causing the fixture to be maintained in the respective configurations while the laser head 74 is being operated to cleave the respective ribbon 58. For example, the actuator 95 may be an electric motor or any other suitable rotary actuator that may be controlled by the controller 96. The controller 96 may coordinate operation of the actuator 95 and the laser head 74. For example, the controller 96 may be a computerized device such as, but not limited to, a programmable logic controller, or any other suitable controller. More specifically and in accordance with the embodiment illustrated in the drawings, the actuator 95 may be configured for both rotating the fixture 80 through respective angular ranges respectively between the configurations of FIGS. 8-11, and causing the fixture to remain substantially stationary in each of the configurations of 8-11; and the controller 96 may be operatively associated with both the actuator and the laser head 74 for: causing the actuator 95 to serially rotate the fixture 80 between the configurations of FIGS. 8-11, causing the actuator 95 to hold the fixture substantially stationary in each of the configuration of 8-11, and causing the laser head 74 to serially emit at least one laser beam in the laser beam path, or more specifically the cleaving plane 78, while the actuator 95 maintains the fixture 80 substantially stationary in each of the configurations of FIGS. 8-11.

The controller 96 may include processing circuitry, such as processing circuitry of a computer, that is configurable to perform actions in accordance with one or more exemplary embodiments disclosed herein. In some exemplary embodiments, the processing circuitry may include a processor and memory. The processing circuitry may be in communication with or otherwise control, for example, a user interface, and one or more other components, features and/or modules (e.g., software modules). The processor may be embodied in a variety of forms. For example, the processor may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor may comprise a plurality of processors. The plurality of processors may be in operative communication with each other and may be collectively configured to perform one or more functionalities of this disclosure. In some exemplary embodiments, the processor may be configured to execute instructions that may be stored in the memory or that may be otherwise accessible to the processor. As such, whether configured by hardware or by a combination of hardware and software, the processor is capable of performing operations according to various embodiments of this disclosure.

In some exemplary embodiments, the memory may include one or more memory devices. The memory may include fixed and/or removable memory devices. In some embodiments, the memory may provide a non-transitory computer-readable storage medium that may store computer program instructions that may be executed by the processor. In this regard, the memory may be configured to store information, data, applications, instructions and/or the like for enabling the cleaving system 11 to carry out various functions in accordance with the various embodiments of this disclosure. In some embodiments, the memory may be in communication with one or more of the processor, user interface, and one or more other modules via bus(es) for passing information.

The user interface may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The relative movement between the cleaving plane 78 and fixture 80 may be provided in any suitable manner. For example, in some embodiments, the ribbons 58 may be sequentially positioned in the cleaving plane 78 in response to moving the laser head 74 and cleaving plane 78 relative to the fixture 80 while the fixture 80 may be held stationary.

Persons skilled in optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A method for processing optical fibers, comprising:
securely holding both a first plurality of optical fibers of a cable and a second plurality of optical fibers of the cable with a fixture that at least partially separates the first and second pluralities of optical fibers from one another;
cleaving the first plurality of optical fibers with at least one laser while the first and second pluralities of optical fibers are securely held stationary by the fixture;
then causing movement of the fixture while the first and second pluralities of optical fibers remain securely held by the fixture; and
then cleaving the second plurality of optical fibers with the at least one laser while the first and second pluralities of optical fibers remain securely held by the fixture.

2. The method of claim 1, wherein:
the securely holding of the first and second pluralities of optical fibers with the fixture is comprised of the first plurality of optical fibers extending within a first holder of the fixture, and the second plurality of optical fibers extending within a second holder of the fixture; and
the method further comprises respectively removing the first and second pluralities of optical fibers from the first and second holders after the cleaving of the second plurality of optical fibers.

3. The method of claim 1, further comprising:
removing the first and second pluralities of optical fibers from the fixture; and
installing the first and second pluralities of optical fibers in a ferrule of a connector.

4. The method of claim 1, wherein the causing of the movement of the fixture is comprised of causing rotation of the fixture, so that:
cleaved ends of the first plurality of optical fibers become more distant from a laser beam path defined by the at least one laser; and
the second plurality of optical fibers become closer to the at least one laser beam path.

5. The method of claim 1, wherein:
the cleaving of the first plurality of optical fibers with the at least one laser is comprised of causing at least one laser beam to move within a cleaving plane, and portions of the first plurality of optical fibers being positioned in the cleaving plane; and
the causing of the movement of the fixture is comprised of rotating the fixture about an axis parallel to the cleaving planer, so that:
cleaved ends of the first plurality of optical fibers rotate away from the cleaving plane, and
the second plurality of optical fibers rotate toward the cleaving plane.

6. The method of claim 1, wherein:
the cleaving of the first plurality of optical fibers is comprised of serially cleaving optical fibers of the first plurality of optical fibers with the at least one laser; and
the cleaving of the second plurality of optical fibers is comprised of serially cleaving optical fibers of the second plurality of optical fibers with the at least one laser.

7. The method of claim 1, wherein:
the first plurality of optical fibers are part of a first optical fiber ribbon;
the cleaving of the first plurality of optical fibers is comprised of cleaving the first optical fiber ribbon;
the second plurality of optical fibers are part of a second optical fiber ribbon; and
the cleaving of the second plurality of optical fibers is comprised of cleaving the second optical fiber ribbon.

8. A method for processing optical fibers, comprising:
securely holding a plurality of optical fiber ribbons with a fixture that at least partially separates the plurality of optical fiber ribbons from one another, wherein the plurality of optical fiber ribbons includes first and second optical fiber ribbons;
cleaving the first optical fiber ribbon with at least one laser beam while the first and second optical fiber ribbons are securely held stationary and separated by the fixture;
rotating the fixture so that the fixture carries a cleaved end of the first optical fiber ribbon away from a cleaving plane defined by the at least one laser beam, and so that the fixture carries a portion of the second optical fiber ribbon into the cleaving plane by rotating the fixture about an axis parallel with the cleaving plane;
then cleaving the second optical fiber ribbon while the first and second optical fiber ribbons are securely held stationary and separated by the fixture; and
removing the first and second optical fiber ribbons from the fixture after the first and second optical fiber ribbons have been cleaved.

9. The method of claim 8, wherein:
the cleaving of the first optical fiber ribbon is comprised of serially cleaving optical fibers of the first optical fiber ribbon with the at least one laser beam; and
the cleaving of the second optical fiber ribbon is comprised of serially cleaving optical fibers of the second optical fiber ribbon with the at least one laser beam.

10. The method of claim 8, wherein:
the plurality of optical fiber ribbons further includes a third optical fiber ribbon;
the cleaving of the first optical fiber ribbon is comprised of cleaving the first optical fiber ribbon with the at least one laser while each of the first, second, and third optical fiber ribbons is at least partially supported and separated by the fixture;
the rotating of the fixture is comprised of rotating the fixture through a first angular range so that the fixture carries the cleaved end of the first optical fiber ribbon away from the cleaving plane, the fixture carries the portion of the second optical fiber ribbon into the cleaving plane, and the fixture carries a portion of the third optical fiber ribbon toward the cleaving plane; and
the cleaving of the second optical fiber ribbon comprises cleaving the portion of the second optical fiber ribbon with the at least one laser while each of the first, second, and third optical fiber ribbons is at least partially supported and separated by the fixture.

11. The method of claim 10, further comprising:
rotating the fixture through a second angular range so that the fixture carries the cleaved end of the first optical fiber ribbon farther away from the cleaving plane, the fixture carries a cleaved end of the second optical fiber ribbon away from the cleaving plane, and the fixture carries the portion of the third optical fiber ribbon into the cleaving plane; and then cleaving the portion of the third optical fiber ribbon with the at least one laser while each of the first, second and third optical fiber ribbons is at least partially supported by the fixture.

12. The method of claim 11, wherein the first angular range has a magnitude that is approximately equal to a magnitude of the second angular range.

13. The method of claim 11, wherein:
a fiber optic cable includes each of the first, second and third optical fiber ribbons; and
during each step of the method, the first, second and third optical fiber ribbons extend outwardly from within a sheath of the fiber optic cable.

14. A laser cleaving system, comprising:
a frame;
at least one laser mounted to the frame for providing at least one cleaving plane; and
a fixture pivotably mounted to the frame about a rotary axis perpendicular to the cleaving plane, the fixture comprising a plurality of holders, wherein:
the plurality of holders comprises both a first holder for holding at least a first plurality of optical fibers, and a second holder for holding at least a second plurality of optical fibers, at least a portion of each holder extending radially with respect to the axis,
the fixture is mounted to the frame for moving between a plurality of configurations,
the plurality of configurations comprises a first configuration and a second configuration,
in the first configuration, the first holder is closer than the second holder to the at least one laser beam path, and
in the second configuration, the second holder is closer than the first holder to the at least one laser beam path.

15. The laser cleaving system of claim 14, wherein the fixture is configured for at least partially separating the first and second plurality of optical fibers from one another.

16. The laser cleaving system of claim 14, wherein:
the first holder comprises an elongate first receptacle;
the second holder comprises an elongate second receptacle; and
the first and second receptacles extend divergently with respect to one another in a direction away from the rotary axis of the fixture.

17. The laser cleaving system of claim 14, further comprising:
an actuator configured for both rotating the fixture between the plurality of configurations and causing the fixture to remain substantially stationary in each configuration of the plurality of configurations; and
a controller operatively associated with both the actuator and the at least one laser for respectively causing:
the actuator to serially rotate the fixture between the plurality of configurations,
the actuator to maintain the fixture substantially stationary in each configuration of the plurality of configurations, and
the at least one laser to serially emit at least one laser beam in the at least one cleaving plane while the actuator maintains the fixture substantially stationary in each configuration of the plurality of configurations.

18. The laser cleaving system of claim 14, wherein:
the plurality of holders further comprises a third holder for holding a third plurality of optical fibers;
the plurality of configurations further comprises a third configuration; and
in the third configuration, the third holder is closer than both of the first and second holders to the at least one cleaving plane.

* * * * *